United States Patent [19]
Reyniers

[11] Patent Number: 4,610,784
[45] Date of Patent: Sep. 9, 1986

[54] METHOD AND APPARATUS FOR CLEANING AND FILLING AN AQUARIUM

[76] Inventor: Lance Reyniers, 7705 N. Edgeworth Dr., Milwaukee, Wis. 53223

[21] Appl. No.: 684,940

[22] Filed: Dec. 21, 1984

[51] Int. Cl.[4] .......................... E04H 3/16; E04H 3/20
[52] U.S. Cl. ................. 210/169; 210/416.2; 119/3; 119/5
[58] Field of Search ............ 210/169, 136, 416.2, 210/418, 220, 221.2; 119/3, 5; 137/528; 417/478, 181, 185; 4/256; 134/10, 111

[56] References Cited

U.S. PATENT DOCUMENTS

| | | | |
|---|---|---|---|
| 1,826,829 | 10/1931 | Scott | 417/181 |
| 1,930,284 | 10/1933 | Reedy et al. | 417/181 |
| 1,950,172 | 3/1934 | Gavaza | 417/181 |
| 2,112,290 | 3/1938 | Holland | 417/181 |
| 2,672,987 | 3/1954 | Hutchinson | 210/136 |
| 2,741,997 | 4/1956 | Parker | 137/528 |
| 2,956,507 | 10/1960 | Hutchinson | 417/478 |
| 3,304,564 | 2/1967 | Green et al. | 210/169 |
| 3,734,853 | 5/1973 | Horvath | 210/169 |
| 3,738,620 | 6/1973 | Ennis | 210/169 |

*Primary Examiner*—Andrew H. Metz
*Assistant Examiner*—Sharon T. Cohen

[57] ABSTRACT

A method and apparatus for use in cleaning and refilling an aquarium tank and including an elongated flexible hose, a gravel tube including an upper end connected to one end of the flexible hose, and a lower end adapted to be immersed in the aquarium tank such that the lower end is adjacent the bottom of the aquarium tank. The gravel tube has a diameter substantially larger than the diameter of the elongated flexible hose. A faucet pump is provided for connecting the other end of the elongated flexible hose to a faucet. The faucet pump functions to cause selective and alternative flow of water from the aquarium tank through the gravel tube and the elongated flexible hose to the drain wherein gravel is churned in the gravel tube and sediment is separated from the gravel and carried away with the water to the drain. The faucet pump can then cause a reverse flow of water from the faucet to the aquarium tank for refilling the aquarium tank.

12 Claims, 6 Drawing Figures

METHOD AND APPARATUS FOR CLEANING AND FILLING AN AQUARIUM

FIELD OF THE INVENTION

The present invention is directed to a method and apparatus for use in cleaning an aquarium and for draining and filling the aquarium.

BACKGROUND PRIOR ART

Large aquariums of the type for use in containing tropical fish and having a 20 to 50 gallon capacity commonly include an undergravel filter. Aquariums must be cleaned periodically to remove sediment from the gravel in the aquarium. It is also necessary to periodically remove water from the aquarium and add fresh water. If the aquarium is relatively large and has a capacity of 20 to 50 gallons or more, cleaning of the aquarium can be a difficult and time-consuming task, and changing of the aquarium water can require removal of a substantial quantity of water. For example, it is common that when aquarium water is drained and replaced, one-third of the water in the aquarium is removed and replaced. In the case of aquariums of 50 gallons or more, this is a large quantity of water to carry by hand, and is very time-consuming.

Prior art apparatus for use in cleaning an aquarium is shown in the Hutchinson U.S. Pat. Nos. 2,672,987 and 2,956,507. These devices each comprise a conduit having one end which is inserted into the aquarium and placed close to the bottom. An opposite end supports a mesh bag or filter. A bulb-type pump is mounted between the opposite ends of the conduit and functions to permit water to be manually pumped through the conduit. The lower end of the tube is placed adjacent the bottom of the aquarium and water is pumped through the conduit drawing sediment from the gravel up through the tube and through the conduit and through the filter. The filtered water is then allowed to drain back into the aquarium.

The structures of the type shown in the Hutchinson patents have the drawback of producing insufficient flow of water to effectively clean the aquarium tank. The undergravel filters used in large aquariums tend to pull the sediment down into the gravel at the bottom of the aquarium tank. The apparatus of Hutchinson does not effectively clean the gravel nor the undergravel filter because it produces insufficient water flow.

The prior art apparatus of Hutchinson is also intended merely to provide a means for filtering the aquarium water. The water in the aquarium commonly includes not only sediment and other solid contaminants, but also includes liquid and dissolved contaminants. The liquid and dissolved contaminants should be removed from the aquarium in the same manner that solid contaminants are removed. While the Hutchinson structure strains the water and thereby removes some of the solid materials, since the water is returned to the aquarium, the liquid contaminants and dissolved solids are not removed from the aquarium water.

Attention is also directed to the Parker U.S. Pat. No. 2,741,997, issued Apr. 17, 1956; the Holland U.S. Pat. No. 2,112,290, issued Mar. 29, 1938; the Gavaza U.S. Pat. No. 1,950,172, issued Mar. 6, 1934; the Reedy et al. U.S. Pat. No. 1,930,284, issued Oct. 10, 1933 and the Scott U.S. Pat. No. 1,826,829, issued Oct. 13, 1931.

SUMMARY OF THE INVENTION

The present invention provides a method and apparatus for use in cleaning an aquarium tank and also for use in draining and fillng an aquarium tank. The apparatus of the invention provides an improved means for draining water from the aquarium, and during the step of draining water from the tank, the apparatus embodying the invention draws sufficient volume of water from the bottom of the tank that sediment in the undergravel filter and in the gravel is removed, and the gravel is churned with water to facilitate removal of the sediment from the gravel. The amount of water drawn from the aquarium is controlled, however, such that while the gravel is churned and sediment and other relatively light solids are removed from the aquarium, the heavier gravel will fall back to the bottom of the aquarium.

More particularly, the apparatus comprises an elongated flexible hose and a gravel tube having one end connected to one end of the flexible hose. The opposite end of the gravel tube is adapted to be immersed in the aquarium tank such that the lower end of the gravel tube is adjacent the bottom of the aquarium tank. An opposite end of the elongated flexible hose is connected to a faucet by a faucet pump arrangement including means for causing selective and alternative flow of water from the aquarium tank through the gravel tube and the elongated flexible hose to the drain, and alternatively, flow of water from the faucet to the aquarium tank for refilling the aquarium tank. In a preferred form of the invention the faucet pump arrangement causes sufficient flow of water through the gravel tube that gravel adjacent the bottom of the aquarium tank will be churned in the gravel tube, and sediment at the bottom of the tank adjacent the lower end of the gravel tube will be drawn into the gravel tube and discharged through the elongated flexible hose to the drain.

In one embodiment of the invention the faucet pump comprises a tube having opposite ends, one end being adapted to be threaded onto the faucet and an opposite end adapted to discharge water into the drain. The tube includes a venturi section intermediate its opposite ends, and the elongated flexible hose is connected to the venturi section of the tube whereby water flow from the faucet through the tube causes water to be drawn through the elongated flexible hose and discharged into the drain.

In one embodiment of the invention a valve is also provided for controlling flow of water through the water discharge end of the tube, the valve including a valve member moveable between a first position wherin water flow to the discharge end of the tube is obstructed and water from the faucet is forced through the elongated flexible hose, and a second positon wherein water can flow from the faucet through the discharge end of the tube to the drain.

In a preferred embodiment of the invention the apparatus also includes a valve intermediate the opposite ends of the elongated flexible hose and for controlling the flow of water through the elongated flexible hose.

One of the principal features of the invention is that the apparatus embodying the invention functions to remove a portion of the water from the aquarium tank and also functions to clean the tank at the same time as water is being removed. Dissovled impurities in the water in the aquarium tend to settle to the bottom of the aquarium. The present invention provides a method and apparatus for cleaning an aquarium tank which functions to remove water from the bottom of the aquarium and therby to remove that water containing the highest concentration of dissolved impurities or liquid contaminants. The apparatus of the invention also functions to remove sediment from the gravel and to clean the undergravel filter. As water is pulled from the bottom of the aquarium, the water draws gravel and sediment up into the gravel tube where the gravel is churned and sediment is discharged with the water drained from the tank. The gravel will settle back to the floor of the aquarium. In a preferred form of the invention, the flow of water through the gravel tube will also be strong enough that sediment collected in the undergravel filter will also be removed from the filter and discharged with the waste water. In the normal operation of the apparatus embodying the invention, ater about one-third of the water from the aquarium has been removed, the valve can be switched to then cause flow of water from the faucet through the conduit or hose into the aquarium to refill the aquarium.

The apparatus of the invention thus provides a convenient means for draining a portion of the water from the aquarium while simultaneously cleaning the gravel and undergravel filter of sediment while also providing a means for conveniently filling the aquarium. This method and apparatus substantially reduces the amount of time and effort otherwise required for changing the water in the aquarium. It also insures that the water removed from the aquarium is that containing the highest concentration of impurities.

Various other features and advantages of the invention will be apparent by reference to the following description of a preferred embodiment, from the drawings and from the claims.

Figure 2:
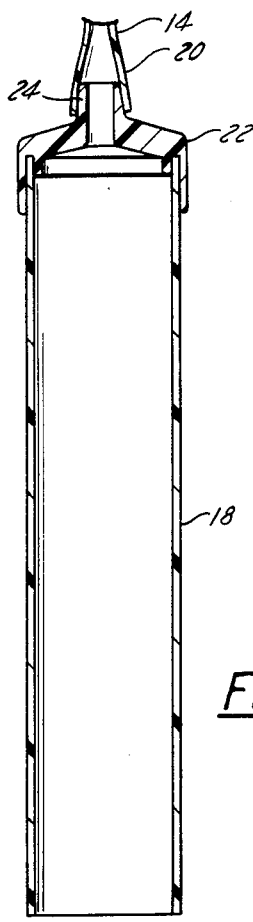
FIG. 2 is an enlarged cross-section elevation view of a gravel tube embodied in the apparatus illustrated in FIG. 1.
Figure 3:
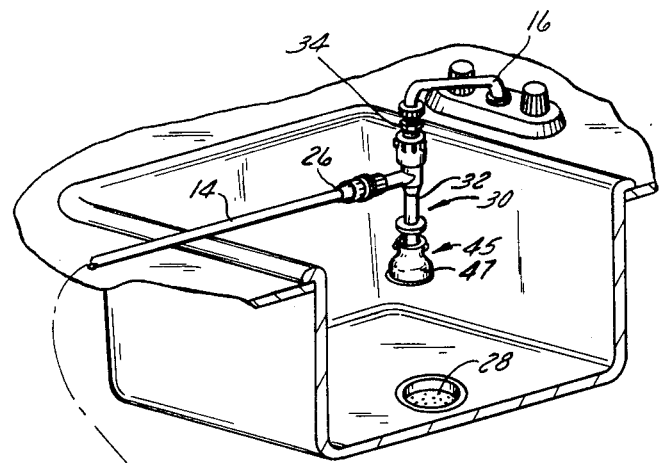
FIG. 3 is an enlarged cross-section view of a flow control valve embodied in the apparatus illustrated in FIG. 1.
Figure 3:
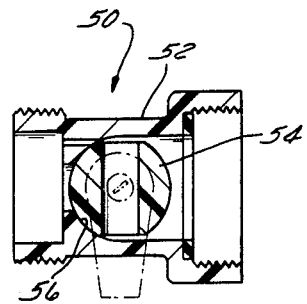

Before describing a preferred embodiment of the invention in detail, it is to be understood that the invention is not limited in its application to the details of construction nor to the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 1:
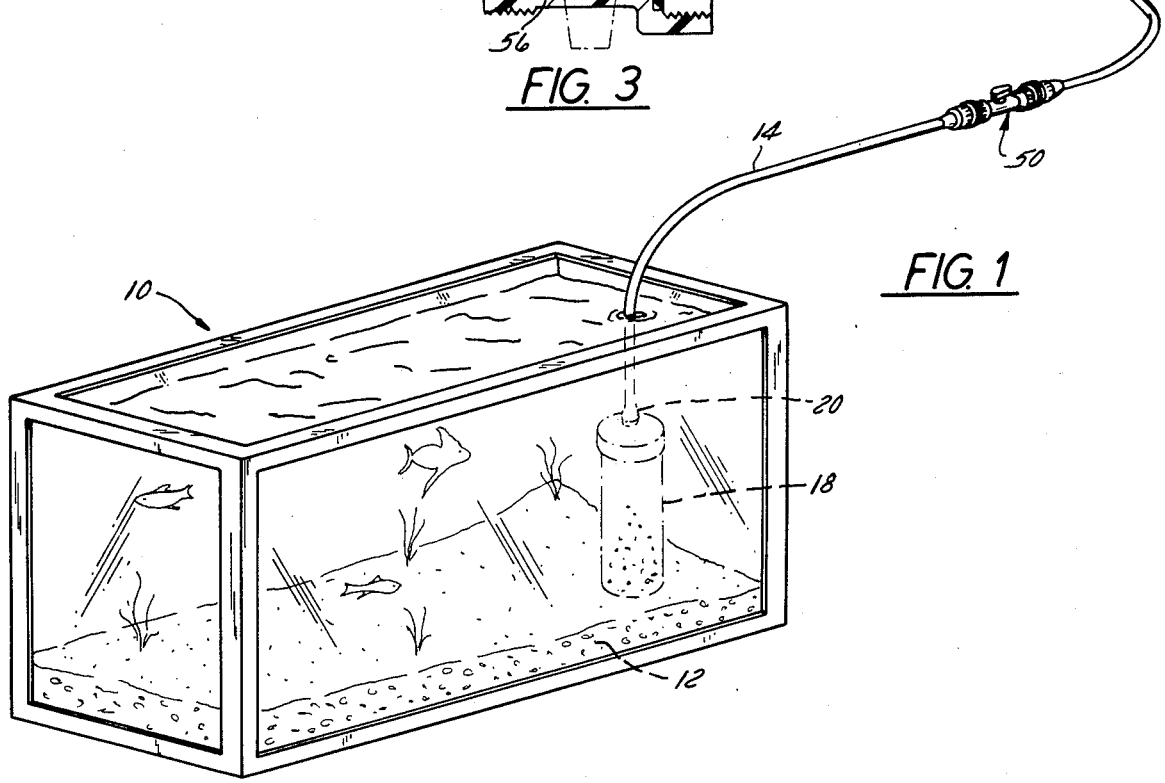
FIG. 1 is a perspective view of apparatus embodying the invention used in cleaning an aquarium.

Illustrated in FIG. 1 is an apparatus embodying the invention and adapted for use in cleaning sediment from an aquarium 10 and also for use in draining and filling the aquarium. In the illustrated arrangement the aquarium 10 is shown as comprising a large glass tank having a floor covered with a layer of gravel 12. The aquarium 10 may also include a conventional undergravel filter (not shown) supported by the floor of the aquarium tank and covered with the layer of gravel 12.

During operation of a conventional undergravel filter, the water in the aquarium 10 is pulled downwardly through the gravel 12. This flow of water through the filter causes and accumulation of impurities and solids in the filter and also causes sediment to be pulled down into the gravel 12.

The present invention includes an elongated flexible plastic hose 14 having one end adapted to be connected to a water faucet 16 and an opposite end connected to a gravel tube 18 adapted to be immersed in the aquarium 10. While the flexible plastic hose 14 could have other constructions, in the illustrated arrangement it comprises a long flexible transparent hose having an inside diameter of approximately ½ inch.

The cylindrical gravel tube 18 has opposite ends, one of these ends being fixed to one end 20 of the elongated hose 14 and in fluid communication with the elongated hose such that water in the gravel tube 18 will flow into the elongated hose 14. More specifically, means are provided for forming a fluid tight connection between the end of the gravel tube 18 and the end 20 of the elongated hose 14. In the illustrated arrangement that means includes a molded plastic cap 22 fitting over the upper end of the cylindrical gravel tube 18 in fluid tight relation and including a coupling 24 adapted to be inserted into the end of the elongated hose in fluid tight engagement. While the gravel tube 18 could be constructed in other ways, in the illustrated arrangement it comprises a transparent plastic tube or cylinder having an inside diameter of approximately two inches, and the gravel tube 18 is constructed of relatively rigid plastic. The gravel tube 18 is adapted to be placed in an aquarium with the lower end of the gravel tube adjacent the gravel 12.

Means are also provided for connecting the opposite end 26 of the elongated flexible plastic hose 14 to the water faucet 16, this means including means for alternatively and selectively causing flow of water from the faucet 16 to a drain 28, and thereby causing water to be drawn out of the aquarium 10 by suction through the elongated hose 14 and into the drain 28, and alternatively causing flow of water from the faucet 16 through the elongated hose 14 into the aquarium 10. In a preferred form of the invention, the means for connecting the elongated hose 14 to the faucet 16 comprises a faucet pump 30 including a first tube 32 including an upper end adapted to be connected by a coupling or adaptor 34 to the faucet 16 and a lower end adapted to discharge the water from the faucet 16 into the drain 28. The first tube 32 includes a venturi section 36 (FIG. 4) intermediate its opposite ends. While the upper end of the tube 32 could be connected to the faucet in various ways, in the illustrated construction, the coupling 34 includes a threaded upper end 38 adapted to be threaded into the threaded end of the faucet 16 and a threaded lower end 40 adapted to be threaded into the upper end of the first tube 32. The faucet pump 30 also includes a second tube portion 44 having one end intersecting the first tube 32 at the venturi section and the opposite end adapted to be connected to the end 26 of the elongated hose 14.

Means are also provided for controlling flow of water through the lower or discharge end of the first tube portion 32. In the particular arrangement illustrated, the faucet pump 30 includes a valve 45 at the lower or discharge end of the first tube and functional to provide means for selectively closing the lower end of the first tube. When the valve 45 is open, water can flow through the venturi section 36 to the drain 28 thereby causing suction of water from the elongated hose 14. When the valve 45 is closed, water from the faucet 16 will be forced through the elongated hose 14 to the aquarium 10. While the valve 45 could have other conventional constructions, in the illustrated arrangement, it includes a valve bell 47 surrounding the lower end of the tube 32 and including a valve member 49 movable between a position shown in FIG. 4 wherein water can flow freely from the end of the tube, to a position shown in FIG. 5 wherein the valve member engages to lower end of the tube 32 to seal that open end.

Figure 6:
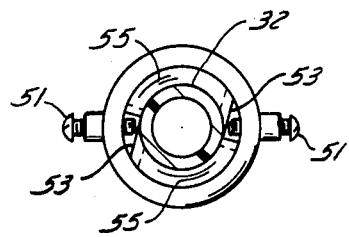
FIG. 6 is a cross section view taken on line 6—6 in FIG. 4.
Figure 4:
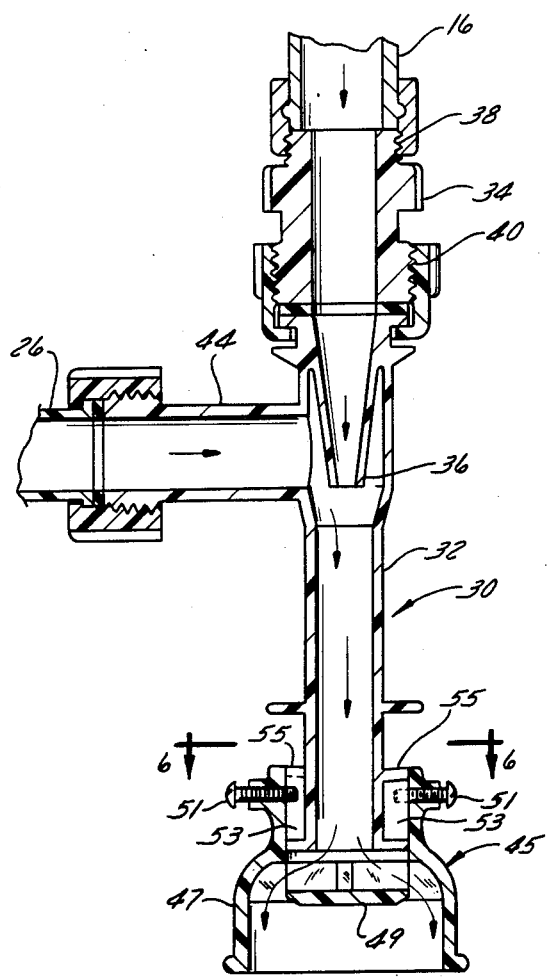
FIG. 4 is an enlarged cross-section elevation view of a faucet pump embodied in the apparatus illustrated in FIG. 1 and with the faucet pump flow control arrangement positioned such that water will flow to the drain.
Figure 5:
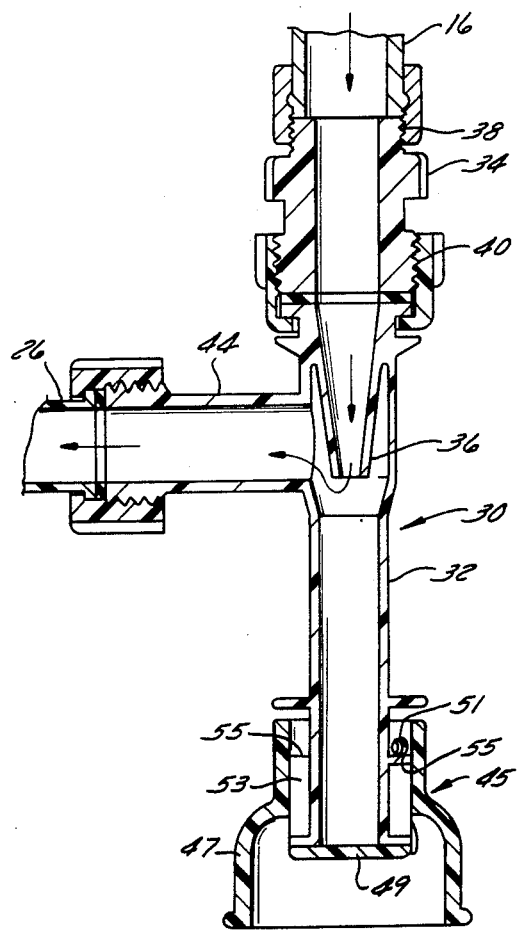
FIG. 5 is a view similar to FIG. 4 and showing the faucet pump flow control arrangement positioned such that water will flow from the faucet into the aquarium tank.

Means are also provided for supporting the valve bell 47 for shiftable movement between the position shown in FIG. 4, wherein water can flow through the tube 32 to the drain, and the closed position shown in FIG. 5 wherein water flow through the tube 32 is precluded. While this means could have various constructions, in the illustrated arrangement it includes a pair of screws 51 supported by the upper end of the valve bell 47 and extending inwardly. The periphery of the tube includes a pair of slots 53 for selectively housing the screws 51 for slideable movement in the direction of the length of the tube. A pair of spaced apart flanges 55 extend outwardly from opposite sides of the tube. When the valve bell 47 is in the position shown in FIGS. 4 and 6, the valve bell 47 can be moved slideably upwardly with respect to the tube until the valve member 49 engages the lower end of the tube 32. The valve bell 47 can then be rotated until the screws engage the upper surfaces of the flanges 55 wherein the valve member 49 will be secured against the lower end of tube 32.

In a preferred form of the invention the faucet pump 30 can comprise a superpump model faucet pump manufactured by Blue Magic Corporation, Stockton, California and can be of the type commonly used for filling and emptying a conventional waterbed. Such a faucet pump produces an efficient means for drawing water from the aquarium 10 and is capable of removing a large quantity of water from the aquarium 10 in response to flow of water from the faucet 16 through the venturi 36.

Means are further provided for controlling the water flow through the elongated hose 14. In the preferred form of the invention this means includes a flow control valve 50 in the elongated hose 14 adjacent the end 20 of the hose 14 connected to the gravel tube 18. While various manually operable valves could be used, in the illustrated arrangement the valve 50 comprises a butterfly valve including a body 52 and a valve member 54 shiftable between an open position and a closed position. In a preferred form of the invention, the valve 50 is located relatively close to the end 20 of the elongated flexible hose 14 supporting the gravel tube in order to permit the operator to control the water flow through the gravel tube 18 and the hose 14 while holding the gravel tue 18.

In operation of the apparatus embodying the invention, the adaptor 34 is threaded onto the water faucet 16 to connect the faucet pump 30 to the faucet 16. The control valve 50 is closed to preclude water flow through the hose 14. The valve 46 controlling flow of water through the water pump 30 is open to permit flow of water through the first tube 32. The faucet 16 is then turned on to cause flow of water through the venturi section 36 of the tube 32. The gravel tube 18 can then be immersed in the water of the aquarium with the lower open end of the gravel tube 18 positioned adjacent the gravel 12 at the bottom of the aquarium 10. The operator can then open the valve 50. The flow of water through the venturi 36 generates a substantial suction in the elongated hose 14 to cause water flow from the aquarium into the gravel tube 18. This water flow into the gravel tube 18 will cause sediment and gravel to be pulled up into the gravel tube 18 and cause the gravel to be churned. The gravel is sufficiently heavy that it will fall back to the floor of the aquarium while sediment is carried away with the water discharged through the elongated hose 14. The flow of water into the lower end of the gravel tube 18 is also sufficient to pull sediment away from the undergravel filter to thereby clean the filter.

In a preferred form of the invention, the valve 50 is constructed such that when the valve 50 is closed, and when the valve 46 is in a position to cause water to flow from the faucet 16 through the elongated hose 14, the valve 50 prohibits flow of water into the aquarium 10. On the other hand, when the valve 46 is in a position to cause suction in the elongated hose 14 tending to draw water from the aquarium, the valve 50 permits a controlled flow of water from the aquarium and through the elongated hose. During operation of the aquarium cleaning apparatus, when a sufficient quantity of water has been removed from the aquarium 10 and the valve 50 is closed, there will be sediment contained in the gravel tube 18. Even when the valve 50 is close, the valve 50 permits a sufficient flow of water from the gravel tube 18 into the elongated hose 14 that sediment contained in the gravel tube 18 will be pulled from the gravel tube 18 into the elongated hose 14 and will not be permitted to precipitate to the bottom of the aquarium 10.

In the illustrated construction the valve body 52 is comprised of a relatively rigid material, and the shiftable valve mamber 54 is comprised of a resilient plastic material such as polypropylene. When the valve 50 is close, water pressure from the faucet 16 will force the valve member 54 against the valve seat 56 to thereby provide a fluid tight seal. If the valve of the faucet pump 30 is moved to the FIG. 4 position wherein water is drawn through the elongated hose to the drain 28, the water pressure in the hose 14 will tend to force the valve member 54 away from the valve seat 56 such that there will be limited flow of water through the valve 50 toward the drain.

Various features of the invention are set forth in the following claims.

I claim:

1. Apparatus for use in cleaning and refilling an aquarium tank, the apparatus comprising:
    an elongated flexible hose having opposite ends,
    a gravel tube including an upper end connected to one of the opposite ends of the flexible hose, and a lower end adapted to be immersed in the aquarium tank such that the lower end is adjacent the bottom of the aquarium tank, the gravel tube having a diameter larger thatn the diameter of the elongated flexible hose, and means for connecting the other end of the elongated flexible hose to a water source, said means for connecting including means for causing selective and alternative flow of water from the aquarium tank through the gravel tube and the elongated flexible hose to a drain and flow of water from the water source through the elongated flexible hose to the aquarium tank for refilling the aquarium tank, said means for connecting the other end of the hose to a water source including means for causing sufficient flow of water through the gravel tube, when said means for connecting causes water flow from the aquarium tank to the drain, that gravel adjacent the bottom of the aquarium tank will be churned in the gravel tube, and sediment at the bottom of the tank adjacent the lower end of the gravel tube will be drawn into the gravel tube, separated from the gravel and discharged through the elongaged flexible hose to the drain, said flow of water through said gravel tube being insufficient to cause gravel churned in the gravel tube to pulled into the elongated flexible hose, said means for connecting the other end of the elongated flexible hose to the water source including a faucet pump adapted to be threaded onto a faucet, the faucet pump including a tube having opposite ends, one end being adapted to be connected to the faucet and an opposite end being adapted to discharge water into a drain, a venturi section intermediate said opposite ends of said tube, said elongated flexible hose being connected to said venturi section of said tube whereby water flow from the faucet through said tube causes water to be drawn through the elongated flexible hose and discharged into the drain.

2. Apparatus as set forth in claim 1 and further including means for controlling the flow of water through said elongated flexible hose, said means for controlling including a valve means intermediate the opposite ends of said elongated flexible hose.

3. An apparatus as set forth in claim 2 wherein said valve means intermediate the opposite ends of said elongated flexible hose includes a valve body and a valve member housed in said valve body, said valve member being movable between an open position and a closed position, said valve member blocking flow of water from the water source to the aquarium tank when said valve member is in said closed position, and said valve member providing for a controlled restricted flow of water from said aquarium through said elongated flexible hose when said valve member is in said closed position.

4. An apparatus as set forth in claim 1 wherein said means for causing selective and alternative flow of water from the aquarium tank includes valve means for controlling flow of water through the water discharge end of the tube, said valve means including a valve member moveable between a first position wherein water flow to said discharge end is obstructed and water from the faucet is forced through said elongated flexible hose, and a second position wherein water can flow from said faucet to the discharge end of said tube.

5. Apparatus as set forth in claim 1 wherein the means for connecting the other end of the elongated flexible hose to a faucet further includes valve means for controlling water flow through said tube from the faucet to said opposite end of the tube.

6. An apparatus as set forth in claim 1 wherein said gravel tube comprises a transparent plastic tube having an inside diameter of between approximately one inch and approximately three inches.

7. Apparatus for use in cleaning and refilling an aquarium tank, the apparatus comprising:

an elongated flexible hose having opposite ends and having a first diameter, a gravel tube including an upper end connected to one of the opposite ends of the elongated flexible hose and a lower end adapted to be immersed in an aquarium tank such that the lower end is adjacent the bottom of the aquarium and adjacent the gravel supported on the bottom of the aquarium, the gravel tube having a diameter larger than the diameter of the elongated flexible hose, and means for connecting the other end of the elongated flexible hose to a faucet, said means for connecting including means for causing selective and alternative flow of water from the aquarium tank through the gravel tube and the elongated flexible hose to the drain and flow of water from the faucet to the aquarium tank for refilling the aquarium tank, said means for connecting the other end of the elongated flexible hose to the faucet including a tube having opposite ends, one end being adapted to be connected to the faucet and an opposite end adapted to discharge water into a drain, a venturi section intermediate said opposite ends of said tube, said elongated flexible hose being connected to said venturi section of said tube whereby water flow from the faucet through said tube to the tube opposite end causes water to be drawn through the elongated flexible hose and discharged into the drain, and said means for connecting the other end of the hose to a faucet including means for causing sufficient flow of water through the gravel tube to cause gravel adjacent the bottom of the tank to be churned in the gravel tube and sediment at the bottom of the tank adjacent the lower end of the gravel tube to be drawn into the gravel tube and discharged through the elongated flexible hose into the drain.

8. An apparatus as set forth in claim 7 wherein said means for causing selective and alternative flow of water from the aquarium tank includes valve means for controlling flow of water through said tube to the drain, said valve means including a valve member moveable between a first position wherein water flow to the drain is obstructed and water from the faucet is forced through said elongated flexible hose, and a second position wherein water can flow from said faucet through the tube to the drain.

9. Apparatus as set forth in claim 7 and further including means for controlling the flow of water through said elongated flexible hose, said means for controlling including a second valve means intermediate the opposite ends of said elongated flexible hose.

10. A method for removing a portion of the water from an aquarium and also removing sediment from the aquarium and stirring gravel at the bottom of the aquarium to remove sediment from the gravel and for replacing the water removed from the aquarium to refill the aquarium, the method comprising the steps of providing an elongated flexible hose, providing a gravel tube connected to one end of the elongated flexible hose, the gravel tube comprising a hollow cylinder having an upper end connected to the elongated flexible hose and an open lower end, connecting an opposite end of the elongated flexible hose to a faucet, placing the lower open end of the gravel tube adjacent the bottom of the aquarium and adjacent the gravel supported at the bottom of the aquarium, causing a flow of water from the bottom of the aquarium upwardly through the gravel tube and through the hose, the flow of water through the gravel tube being sufficient to lift gravel into the gravel tube and to churn that gravel so as to separate sediment from the gravel and to cause sediment at the bottom of the aquarium to be pulled into the gravel tube and into the hose, and the flow of water into the gravel tube being sufficient to cause the gravel to be pulled from the gravel tube into the hose, discharging water drawn into the gravel tube through the elongated flexible hose into a drain, and causing a flow of fresh water from the faucet through the elongated flexible hose and through the gravel tube to fill the aquarium, said step of connecting an opposite end of the elongated flexible hose to the faucet including the step of providing a tube having one end connected to the faucet, an opposite end for discharging water into the drain, and a venturi intermediate said opposite ends, said opposite end of said elongated flexible hose being connected to said tube adjacent said venturi whereby water flow from the faucet through the venturi to the drain causes flow of water from the elongated flexible hose into the tube, and wherein the step of causing flow of water from the bottom of the aquarium upwardly through the gravel tube includes discharging water from the faucet to the drain to cause water flow through the hose from the aquarium to the drain.

11. A method as set forth in claim 10 wherein the step of causing flow of water from the bottom of the aquarium causes a sufficient flow of water from the aquarium through the gravel tube and the hose to the drain to cause gravel on the bottom of the aquarium adjacent the lower end of the gravel tube to be churned in the gravel tube to cause separation of sediment materials from the gravel.

12. A method as set forth in claim 11 wherein the gravel in the gravel tube settles to the bottom of the aquarium and sediment from the aquarium is carried by water flowing upwardly through the gravel tube to the hose and to the drain.

* * * * *